A. R. MUTTON.
PIVOTED END LOCK BOLT.
APPLICATION FILED SEPT. 10, 1915.

1,181,336.

Patented May 2, 1916.

Inventor,
A. R. Mutton, by
G. C. Kennedy,
Attorney.

UNITED STATES PATENT OFFICE.

ARTHUR R. MUTTON, OF WATERLOO, IOWA.

PIVOTED END-LOCK BOLT.

1,181,336.     Specification of Letters Patent.     Patented May 2, 1916.

Application filed September 10, 1915. Serial No. 49,915.

*To all whom it may concern:*

Be it known that I, ARTHUR R. MUTTON, a citizen of the United States of America, and a resident of Waterloo, Blackhawk county, Iowa, have invented certain new and useful Improvements in Pivoted End-Lock Bolts, of which the following is a specification.

Figure 1:
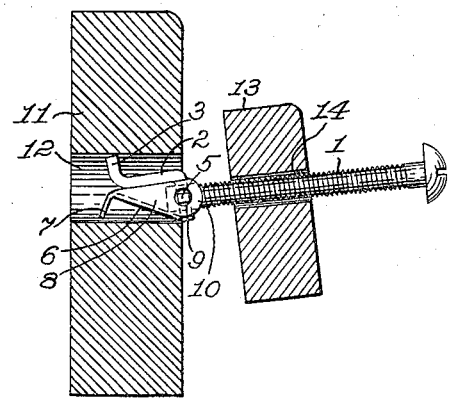
Figure 3:
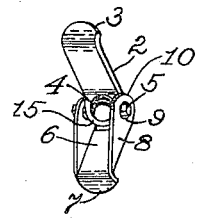
Figure 2:
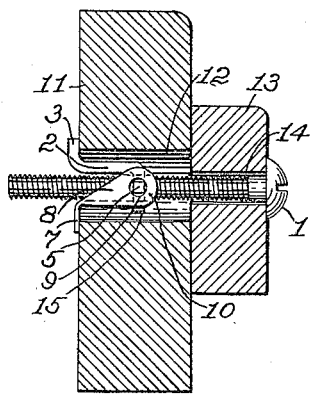
Figure 4:
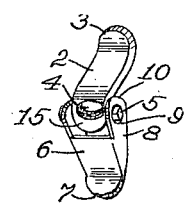

My invention relates to improvements in pivoted end-lock bolts, and the object of my improvement is to provide a device of this kind adapted for use in hanging or otherwise supporting bodies upon a vertical surface of a wall molding. This object I have accomplished by the means which are hereinafter described and claimed, and which are illustrated in the accompanying drawings, in which:

Figure 1 is a cross section of a molding and of a supported body, having alined orifices, with my improved fastening-means collapsed and being inserted in the molding orifice. Fig. 2 is a like view of said parts, with the fastening-means spread and secured in the molding orifice. Figs. 3 and 4 are perspective views of the front and rear respectively of the adjustable fastening-clips, as removed from the carrying bolt.

Similar numerals of reference denote corresponding parts throughout the several views.

My fastening device is particularly useful in supporting bodies upon wall moldings, especially when the moldings are of marble or a like substance. The molding 11 has a transverse orifice 12 to seat my improved fastening-means for any suspended body, such as another molding or hanger 13, the latter having an orifice 14 adapted for alinement with the other orifice.

The fastening-means comprises a headed bolt 1, and hingedly connected clip-bodies 2 and 6 movably mounted on the bolt. The clip-body 2 has its opposite ends 3 and 15 bent in opposite directions, the end-part 15 having a threaded orifice 4 for mounting it movably upon the threaded bolt 1. The part 15 has oppositely-directed integral lateral studs 5.

The numeral 6 denotes another clip-body having one end bent outwardly at 7, and having parallel integral side-parts 8 bent inwardly and having the latter parts carried beyond its other end at 10, the extended parts 10 being orificed at 9 in line and pivotally seated on said studs 5.

When the bolt 1 is passed through the orifice 14 of the supported body 13, the clip-body 2 may have the bolt passed into its orifice to barely extend therethrough. This position of said parts is shown in said Fig. 1, wherein the clip-bodies 2 and 6 are collapsed together, that is, the clip-body 6 is swung inwardly on the pivot-studs 5 toward the other clip-body 2, the latter being fixed against lateral movement relative to said bolt. This so diminishes the transverse width of said bodies, that they may be pushed through the orifice 12 of the molding 11 to have their outwardly-bent clips 3 and 7 located beyond the left-hand end of said orifice.

Referring now to said Fig. 2, it will be seen that when the bolt 1 is turned sufficiently, the ends 3 and 7 of the clip-bodies 2 and 6 are caused to tightly engage opposite parts of the angular edge of the left-hand opening of the wall of said orifice 12, at upper and lower parts thereof, the rigid heavier clip-body 2 at the top to sustain most of the weight of the supported body, when the bolt passes between said bodies and spreads the body 6 away from the body 2. The bolt also draws upon said bodies to compress the clip-ends 3 and 7 upon the molding 11, and the supported body 13 upon the opposite or outer face of the molding. The bolt is held centrally within the alined orifices 12 and 14 so as to have its head bear flatly upon the supported body, preventing the latter from tilting or sagging.

By turning the bolt oppositely, the clips may be released, when the bolt-end has arrived at the clip-end 15, so that the clip-body 6 may swing inwardly.

Having described my invention, what I claim as new, and desire to secure by Letters Patent, is:

1. In combination, a bolt, a clip-body located longitudinally therealong, having one end bent inwardly and provided with a threaded orifice to receive the bolt movably and having its other end bent outwardly, and another clip-body located along the opposite side of said bolt, hingedly connected to the first-mentioned clip-body, and having its outer end bent outwardly.

2. In combination, a headed body, a clip-body mounted thereon for longitudinal movement therealong and having an outwardly directed end part, and another clip-body mounted swingingly on the first-mentioned clip-body and having an outwardly directed end part.

3. In combination, a headed bolt, a clip-body mounted for longitudinal movement therealong, and a clip-body hinged on the first-mentioned clip-body to swing outwardly relative to said bolt, said clip-bodies having engaging-means adapted to engage opposite angles of an orifice in a body through which said bolt is passed.

4. In combination, a headed and threaded bolt, a nut seated on said bolt and having an integral part directed longitudinally along the bolt with an outwardly bent tip, said nut having oppositely-directed integral studs on opposite sides, and a clip-body hinged pivotally on said studs to swing outwardly from the bolt opposite to the longitudinally-extending part of said nut, said clip-body having an outwardly bent tip.

5. In combination, a headed and threaded bolt, a nut seated on said bolt and having a part bent longitudinally along the bolt with outwardly bent tip, having on opposite sides laterally-directed studs, and a clip-body lying along the side of the bolt opposite said nut-extension and having its outer end bent outwardly, said clip-body having side flanges extended from one end to pass on opposite sides of said bolt and nut, with alined orifices in the extended parts to seat said flanges hingedly on said studs to permit the clip-body to swing outwardly from the bolt, the bolt being adapted to spread the clip-body apart from itself when turned to move itself longitudinally between said clip-body and the nut-extension contactingly.

Signed at Waterloo, Iowa, this 27 day of August 1915.

ARTHUR R. MUTTON.

Witnesses:
PEARL M. STANTON,
GEO. C. KENNEDY.

Copies of this patent may be obtained for five cents each, by addressing the "Commissioner of Patents, Washington, D. C."